United States Patent [19]

Matsumura

[11] 4,373,161

[45] Feb. 8, 1983

[54] DOPPLER RADAR MOUNTING STRUCTURE FOR MOTOR VEHICLES

[75] Inventor: Akira Matsumura, Yokosuka, Japan

[73] Assignees: Hitachi, Ltd.; Nissan Motor Co., Ltd., both of Tokyo, Japan

[21] Appl. No.: 179,982

[22] Filed: Aug. 21, 1980

[30] Foreign Application Priority Data

Aug. 25, 1979 [JP] Japan .................. 54-107695

[51] Int. Cl.³ ............................................. H01Q 1/32
[52] U.S. Cl. ...................................... 343/717; 180/167
[58] Field of Search ............... 343/705, 708, 713, 717, 343/7 VM; 180/167, 197

[56] References Cited

U.S. PATENT DOCUMENTS

| | | | |
|---|---|---|---|
| 2,834,014 | 5/1958 | Thorne | 343/705 |
| 3,261,018 | 7/1966 | Mast | 343/708 |
| 3,648,172 | 3/1972 | Nakahara et al. | 343/717 |
| 3,662,392 | 5/1972 | Stapleton | 343/708 |
| 3,794,997 | 2/1974 | Iwatsuki et al. | 343/7 ED |
| 3,918,058 | 11/1975 | Noyeri et al. | 343/7 ED |
| 4,107,680 | 8/1978 | Kaplan | 343/717 |

FOREIGN PATENT DOCUMENTS 1487701  10/1977  United Kingdom .

OTHER PUBLICATIONS

Electronic Skid Control Module, Nissan Motor Co. Ltd., Dec. 1977.

*Primary Examiner*—Eli Lieberman
*Attorney, Agent, or Firm*—Antonelli, Terry & Wands

[57] ABSTRACT

A mounting structure of a Doppler radar vehicle speed sensor for an automobile, especially adapted for damage-free mounting of the radar to a bottom of the automobile which may detrimentally hit on the road surface while the automobile is in motion. In order to protect the radar casing from the attacks by possible flying pebbles and muddy splashes caused by the rotation of the front wheels, the radar casing containing a horn antenna or a slot array antenna is accommodated in a recess or a stepped space formed near the rear wheels in the bottom surface of the floor of the automobile in such a manner that the casing is within the partial space in the recess lying on the side opposite to the road surface with respect to a plane containing the front edge of the recess and the tangent line drawn from the front edge to the outer diameter of the front wheel. The mouth of the antenna is directed toward the rear end of the automobile.

8 Claims, 10 Drawing Figures

DOPPLER RADAR MOUNTING STRUCTURE FOR MOTOR VEHICLES

CROSS-REFERENCES OF RELATED APPLICATION

This application is related to U.S. patent application Ser. No. 78,825, now U.S. Pat. No. 4,346,774 entitled "Doppler Radar Mounting Structure for Motor Vehicles" filed by, Yukitsugu HIROTA, Akira ENDO, katsuhiro KIMURA, Hiroshi MOROZUMI and Kenji SEKINE on Sept. 25, 1979, based on Japanese patent application Nos. 53-118969 and 53-153070 and assigned to the present assignees.

This invention relates to an improvement in the mounting structure of a Doppler radar speed sensor means on a motor vehicle and more particularly to an improvement in a vehicle speed sensing radar adapted for mounting under the floor of an automobile which may detrimentally hit on or contact the road surface.

An example of the conventional vehicle-to-ground speed sensing radar furnished on a vehicle is disclosed in, for example, the British patent specification No. 1,487,701. According to this specification, the housing of a Doppler radar is mounted on the rear axle of a vehicle and the housing is provided with a transmission port for transmitting electromagnetic energy in a flood beam towards the road surface in front of the rear axle and with electromagnetic energy inlet ports for receiving the electromagnetic energy returned from the road surface, at least one of the inlet ports being so arranged that it may receive a signal reflected from a part of the road surface in front of the rear axle. With this mounting structure, the antenna and the antenna housing can be prevented from being damaged when the bottom of the vehicle hits on the road surface during the travel, but since the axle is subject to violent vibration, the fluctuation of the center level of the Doppler signal is too great to use this mounting structure in a practical application. Moreover, since the transmission port is provided on the rear axle and directed in front of the rear axle, it is splashed with muddy water or snow when the front wheels rotate forward on a muddy or snowy road.

In order to eliminate such a problem of splash, a mounting structure of a Doppler radar speed sensor as shown in FIG. 1 has been proposed in the U.S. Ser. No. 78,825 assigned to the present assignees. In FIG. 1, reference numeral 1 indicates a horn antenna, or more concretely the mouth of the horn of a highly sensitive Doppler radar with a rated output power of 5 mW and an oscillation frequency of 24 GHz using a Gunn diode as oscillating source; 2 a waterproof casing of diecast aluminum for housing therein the radar and the antenna; 3 a recess provided in the bottom or underfloor of the vehicle body; and 10 a road surface. The horn antenna, the Doppler radar and the casing constitute a Doppler radar speed sensor. The horn antenna 1 is usually attached to one of the side walls of the rectangular casing 2 in such a manner that the base plane of the horn is inclined at 45° to the side wall. In this mounting structure shown in FIG. 1, for example, the radar casing 2 having the antenna 1 attached thereto is fixed within the recess 3 and the central axis of the radiated electromagnetic energy from the antenna 1 is inclined at an angle $\beta$, usually 45°, with respect to the road surface. With this mounting structure the recess 3 is provided in the position which is seldom subject to splash of snow or muddy water and which is free from damage due to a light accident and the casing 2 with the antenna 1 is placed in the recess 3. Thus, this structure provides a countermeasure for preventing damages to the casing 2 and the antenna 1 even when the bottom of the vehicle body hits on the surface of the road which is very rough and for preventing the attack of the antenna 1 by pebbles and muddy splashes flying to during movement.

However, this Doppler radar has such a structure that the antenna 1 and the casing 2 are not protected from the attacks by pebbles and muddy splashes originating from the rotations of the front wheels during movement. In the case where the casing contains a control circuit for performing some control, e.g. skid control, by using a vehicle speed signal, the size of the casing cannot be reduced since the physical size of the antenna is limited down. Accordingly, such a casing may be subject to the direct attack by stones and pebbles during movement. So, there is a danger that damage of the casing, especially serious damage of the antenna portion is caused.

It is therefore one object of this invention to solve the above problem, that is, to provide a mounting structure for a Dopple radar vehicle speed sensor which is affected by the bad road conditions during movement to the minimum extent possible and is reliable in operation.

Another object of this invention is to provide a mounting structure for a Doppler radar vehicle speed sensor which can reduce either the attack of the radar antenna and casing by the flying pebbles and muddy splashes or the deposition of mud flying in the form of mist on the radar casing whereby the casing with the antenna disposed on the bottom of the vehicle can be protected to detect the vehicle speed stably.

According to a principal feature of this invention, the radar casing with the antenna is disposed in a recess or a stepped portion provided in the bottom or underfloor of a vehicle body. The casing is fully accommodated in a space defined by a front side wall and a top wall of the recess and a tangential plane passing through the front edge of the recess and being tangent to an outer diameter of a vehicle wheel in immediate front of the recess in the direction of travel. The plane in which the mouth end of the horn-like antenna lies may be parallel to the tangential plane or may be directed toward the rear side of the vehicle body. Accordingly, the exposed surface of the radar casing including the mouth end of the antenna is usually inclined to the axis of the vehicle body and the extension of the exposed surface intersects the body floor ahead of the front edge of the recess. With this structure, the position of the radar casing is outside the zone of the attack by the flying pebbles and muddy splashes originating from the forward rotations of the front wheels, and especially the antenna is protected safely from external obstacles and contaminants. Even when there exist wheels in rear of the radar casing, the flying contaminants and foreign matters resulting from these wheels during rotation almost not reach the radar casing.

Now, this invention will be described in detail in conjunction with the accompanying drawings, in which:

FIG. 1 is a schematic drawing of a mounting structure of a vehicle speed sensing radar, illustrating the background of this invention;

FIG. 2 schematically shows an anti-skid control system for use with an automobile, to which this invention is applied;

Figure 1:
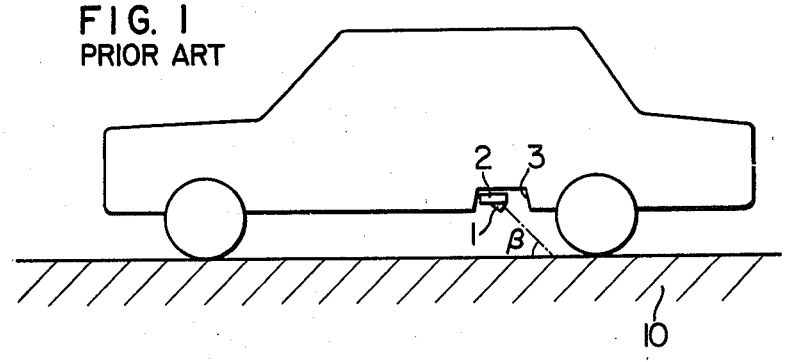
Figure 2:
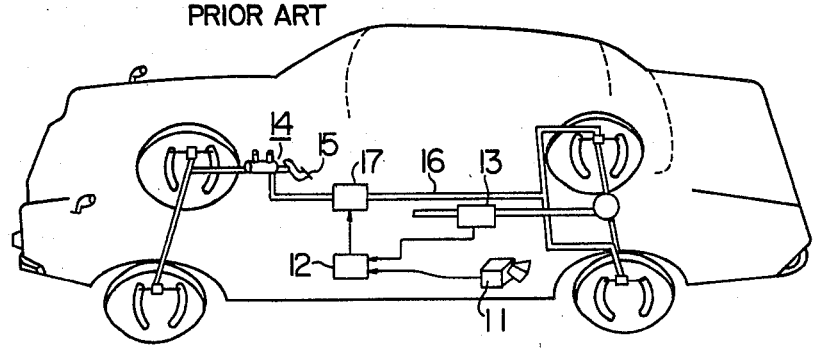

Before the description of the embodiments of this invention, the anti-skid control system for an automobile, to which this invention is to be applied will be explained with reference to FIG. 2. In FIG. 2, a Doppler radar vehicle speed sensor 11 for detecting a vehicle speed called an absolute vehicle speed delivers an output, which is received by an anti-skid control device 12. Reference numeral 13 indicates a wheel speed sensor for detecting a wheel speed and numeral 14 designates a braking mechanism including a brake pedal 15, a brake 16 and a pressure regulator 17. The anti-skid control device 12 compares the vehicle speed with the wheel speed and if the vehicle speed exceeds the wheel speed, the vehicle is judged to be in the skidding state. Accordingly, the pressure regulator 17 is actuated so that the pressure of the brake oil is decreased to decrease braking force. On the other hand, if the wheel speed exceeds the vehicle speed, the vehicle is regarded as running in the normal state so that the oil pressure is not regulated.

Figure 3:
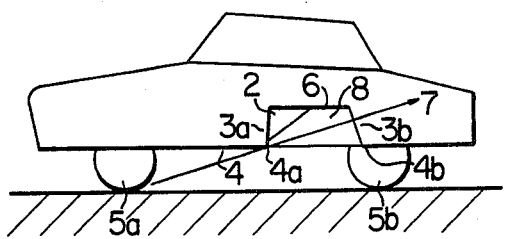
FIG. 3 shows a mounting structure of a Doppler radar speed sensor on an automobile, illustrating the basic concept of this invention.

FIG. 3 illustrates the basic concept of this invention, showing how to mount a Doppler radar apparatus to a bottom member of an automobile. In FIG. 3, a Doppler radar speed sensor comprising the Doppler radar apparatus and an antenna 1 is housed in a casing 2. The casing 2 is completely accommodated in a recess or a stepped space 3 formed in an arbitrary position on the bottom surface of the vehicle floor 4 facing the road surface within a rectangle defined by front and rear wheels 5a and 5b. The mouth end of the antenna 1 is directed to the rear part of the automobile. The recess 3 comprises a top wall 6, a front side wall 3a and a rear side wall 3b as viewed along the axis of the vehicle body, and a front edge 4a defined as a line of intersection between the front side wall 3a and the floor 4 and a rear edge 4b defined as a line of intersection between the rear side wall 3b and the floor 4. In FIG. 3, the recessed portion located under the rear seat in the floor between the front and rear wheels 5a and 5b is used as an example of the recess 3 for accommodating the radar casing 2 therein. The front side wall 3a may be formed of a rib of the bottom member. A straight line 7 is tangent to the front wheel 5a, passing through the front edge 4a. The casing 2 is accommodated at least within a partial space 8 defined by the top wall 6 of the recess 3, the front side wall 3a of the recess 3 and the plane containing the front edge 4a and the tangent line 7. In general, a stone or water brought into contact with the wheel at motion is sent flying or spattered in the direction similar to that of the rotation of the wheel. The stone or water therefore flies in the direction opposite to that of the travel. In case of forward movement, the flying pebbles and muddy splashes from the front wheels 5a reach only the space within the recess 3 on the road-surface side of the above-defined plane containing the front edge 4a and the tangent line 7. If the recess 3 is located in rear of the rear axle, the tangent line 7 to the rear wheel 5b, passing through the front edge should be taken into consideration. The front side wall 3a is so arranged as to be as near to 90° with respect to the axis of the vehicle body as possible. With this configuration, the volume of accommodation of the recess for the casing 2 will be made as large as possible and at the same time the attack of the casing 2 by external flying objects or contaminants can be prevented to a greater extent. The rear side wall 3b is caused to have as gentle or gradual a curve as possible so that the flying pebbles or muddy splashes, after having reflected from the gentle curving surface, tend to travel in the directions other than that toward the opening end of the antenna.

It has been experimentally confirmed that because of using water-repellent cover material in the horn antenna there is no problem of depositing misty mud water on the horn inner surface, which may exert failure to the radar apparatus.

Figure 4:
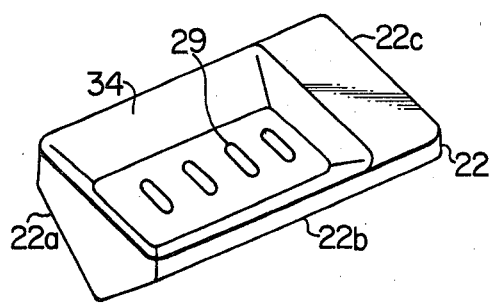
FIG. 4 shows a mounting structure of a radar casing as an embodiment of this invention.

FIG. 4 shows an example of a mounting structure of a Doppler radar apparatus. The casing 2 of the Doppler radar apparatus, which has an antenna 1 integrated therewith, has the shape of a triangular prism whose cross section is a right-angled triangle. The casing 2 may be secured by screws to nuts fixed to the top wall 6 by welding. Alternatively, the casing 2 may be clamped to the vehicle chassis by mounting bolts passed through holes preformed in the underfloor.

Figure 5:
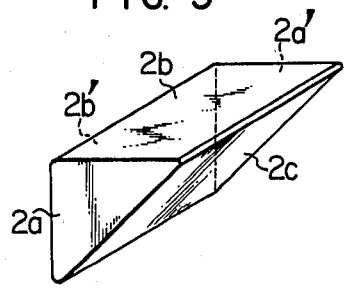
FIG. 5 shows on an enlarged scale the radar casing shown in FIG. 4.

FIG. 5 shows on an enlarged scale the radar casing 2 shown in FIG. 4. The casing 2 has triangular side walls 2a and 2a', a top wall 2b, a front side wall 2b' and a bottom slant wall 2c to which the antenna 1 is attached. The mouth edge of the horn antenna lies on the slant plane wall 2c. The casing 2 is attached to the vehicle body by any suitable fastening means, e.g. bolts, in such a manner that the top wall 2b and the front side wall 2b' of the casing 2 are in contact with the top wall 6 and the front side wall 3a of the recess 3. The recess 3 may have dimensions of at least 100 mm deep, 100 mm wide and 80 mm high. A straight line 9 is a tangent drawn from the front edge 4a to the periphery of the wheel in front of the recess 3. The slant wall 2c of the casing 2 is substantially parallel to the extension of the tangent line 9. The casing 2 is completely accommodated within the closed space defined by the top wall 6 and the front side wall 3a of the recess 3 and the plane containing the front edge of the recess 3 and the tangent line 9. The floor 4 is substantially parallel to the road surface. When a horn antenna is used for the Doppler radar, it is known that the surface-reflection efficiency as well as accuracy of the detected speed is high if the plane containing the mouth edge of the horn is set at 45° to the road surface. Therefore, the horn antenna should be attached to the bottom slant wall 2c of the casing in such a manner that the central axis of the horn makes an angle of 45° with the road surface. When the casing 2 is mounted under the floor the vehicle body, the mouth of the horn antenna is directed toward rear end of the vehicle. As seen from the drawings, the bottom slant wall 2c need not be set substantially parallel to the tangent line 9. It is here to be understood that the mouth of the horn of the Doppler radar apparatus has only to be directed toward the rear end of the vehicle body, that the casing 2 as a whole has only to be completely accommodated within the space 8 defined above, and that the size of the recess 3 should be designed in dependence on the size of the casing 2. As described in the U.S. Ser. No. 78,825, the alignment of the horn antenna, that is, the positioning of the mouth thereof toward the rear end of the vehicle body, is chosen to prevent the direct collision of the flying pebbles and muddy splashes with the inner surface of the horn. Alternatively, the casing may be attached to the top wall 6 within the space 8 if a slot antenna is employed in place of the horn antenna. In such a case, the shape of the casing is not limited to a triangular prism.

Figure 6:
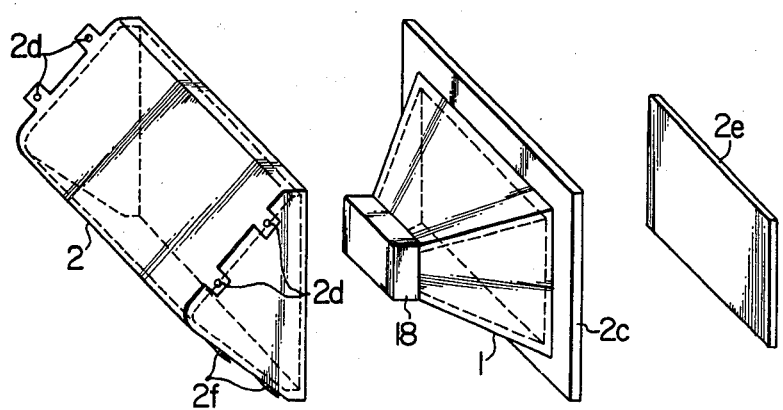
FIG. 6 shows a structure of a radar casing as an embodiment of this invention.

FIG. 6 shows in detail the structures of the casing 2 and the horn antenna 1. The horn antenna 1 is attached to the bottom wall 2c of the casing 2 in the form of a triangular prism. A perforation which is identical in shape with the mouth edge of the horn antenna 1, is cut in the bottom wall 2c and the perforation is covered by a dielectric plate 2e so as to prevent muddy water or the like from intruding into the horn. The dielectric cover 2e may be made of, for example, Teflon (polytetrafluoroethylene). Teflon has a function of preventing the adsorption of fine particles and therefore can prevent dust or misty mud water from slipping into the horn and deteriorating the antenna efficiency. A transmitter/receiver 18 is provided behind the antenna 1. Screw holes 2d and 2f is for the attachment of the casing 2 to the recess 3 by screws therethrough. The horn antenna 1 has, for example, a mouth area of 60 mm×50 mm and a depth of 60 mm. The transmitter/receiver 18 is fixed to the antenna 1 (they may be integrally formed.) and the antenna 1 is fixed to the bottom wall 2c of the casing 2 in the form of a triangular prism, having a perforation identical in shape with the mouth of the horn. The dielectric cover 2e is attached to the bottom wall 2c so as to cover the perforation and the bottom wall 2c is in turn fixed to the casing 2. The casing 2 is attached to the recess 3 by means of screws through the holes 2d and 2f. If the vehicle body initially has a recess or a stepped space which can completely accommodate the radar apparatus therein, it may be used as the recess 3.

Figure 7:
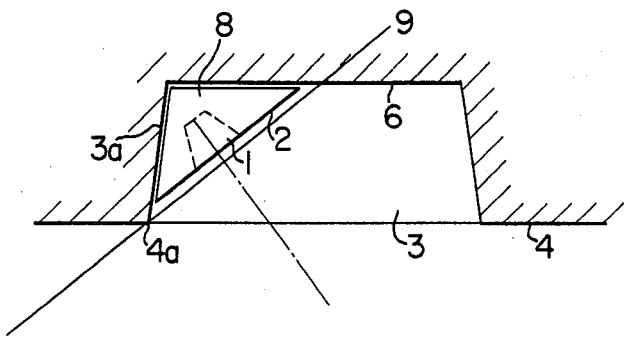
FIG. 7 is an external view of a radar casing as another embodiment of this invention.
Figure 8:
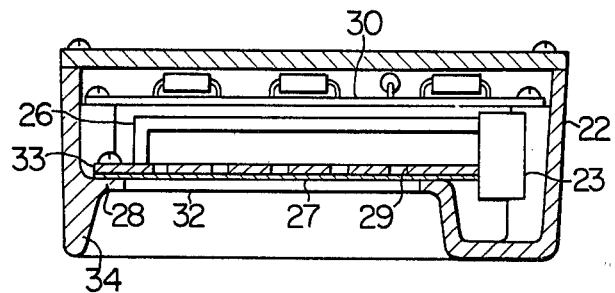
FIG. 8 is a cross section of the radar casing shown in FIG. 7.

FIGS. 7 and 8 respectively show in external view and in cross section the casing 22 of a radar module containing an integral combination of a Doppler radar apparatus and a slot array antenna, used in this invention. The radar module may take such a structure as disclosed in the above-referenced U.S. Ser. No. 78,825. In this embodiment, since a slot array antenna is used in place of a horn antenna, the overall size of the radar module can be lessened so that the module casing can also be reduced in size and therefore that the module casing can be accommodated more easily in the limited space within the recess in the vehicle floor.

As shown in FIGS. 7 and 8, the slot array antenna has a metal casing 22, a waveguide 26 and an array of slots 29 formed in a portion of the waveguide adjacent to an opening 32 in the metal casing 22. A water-proof sheet 27 of dielectric material such as Teflon is attached to a sheet fixing plate 28 to cover the array of slots 29. The mouth 32 of the antenna is located at the bottom of the flared part of the metal casing 22 and electromagnetic waves radiated through the slots are confined within the horn-like side wall 34 so as to provide directivity. In this case, by virtue of the horn-like side wall 34, the overall antenna gain is equal to the gain of the slot antenna plus that of a horn antenna. Moreover, with this structure, since the slots exposed toward the road surface are located in the recessed portion of the casing, they can be prevented from being spoiled by foreign matters. The casing 22 has walls 22a, 22b and 22c (with lengths of 40 mm, 100 mm and 60 mm respectively) corresponding to the top wall 2b, the front side wall 2b' and the bottom wall 2c shown in FIG. 5 and the casing 22 is attached in the recess 3 to the vehicle body in such a manner that the walls 22a and 22b are in contact respectively with the front side wall 3a and the top wall 6.

The waveguide 26 is so disposed in the casing 22 as to case the array of slots 29 to be located at the bottom of the flared wall of the antenna. At one end of the waveguide is provided a transmitter/receiver 23 which incorporates therein a microwave generator using a Gunn diode and which generates and receives microwaves. The other end of the waveguide terminates in a non-reflective end or a short-circuited end. Also in the casing 22 is provided a printed circuit board 30 serving as a processor for processing signals from the transmitter/receiver 23. For example, in the case of a Doppler radar apparatus having seven slots separated by about 1 cm from one another and an oscillation frequency of 24 GHz, the half beam width of radiated electromagnetic waves is ±7°.

Figure 9:
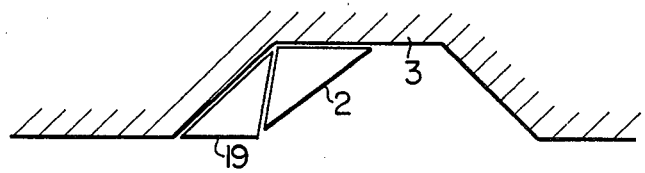
FIG. 9 shows the shape of a recess formed in the floor of an automobile.

FIG. 9 shows another embodiment of this invention, adapted for application to a vehicle which initially has no recess for accommodating a radar casing in the form of a triangular prism. In this case, a recess is formed later to be adapted for mass production. With the body floor having such a structure as shown in FIG. 9, the antenna casing is accommodated in a recess 3 having a gently sloping front side wall 3a. Accordingly, even when the floor hits on the road surface, the antenna and the antenna casing can be prevented from being damaged. However, the gently sloping front side wall 3a may allow the flying pebbles and muddy splashes to impinge upon the antenna. In order to solve this problem and also to provide reinforce, a bracket member 19 is used to provide a substantially vertical front side wall. Moreover, a suitable recess may be formed in the initial stage of the vehicle body fabrication according to design, or the radar casing may be so designed as to fit for the original recess (for example, the casing may be in the form of a rectangular prism).

Figure 10:
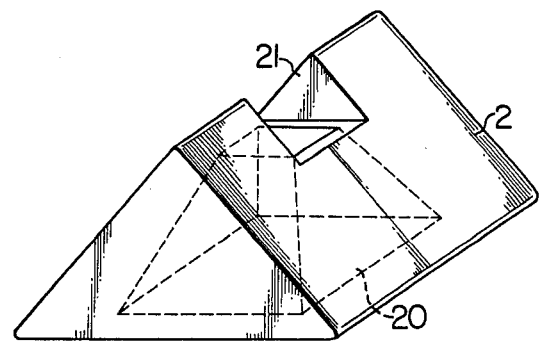
FIG. 10 shows a structure in which radar casing and antenna are formed integrally.

FIG. 10 shows another embodiment of this invention, in which the antenna and the antenna casing are integrally formed. In FIG. 10, reference numeral 2 designates a casing; 20 the mouth of an antenna; and 21 a notch for mounting a transmitter/receiver (not shown) therein.

What is claimed is:

1. A mounting structure of a Doppler radar speed sensor for an automobile, said Doppler radar speed sensor having an antenna section having an antenna mouth and a sensor section, being housed in a casing and attached to a bottom surface of a floor of said automobile for detecting the speed of said automobile, said mounting structure comprising:

a chamber formed in said floor forward of rear wheels of the automobile and rearward of front wheels of the automobile, which is recessed upward from the floor and open downward relative to a road surface for accommodating said casing of said sensor, and having a front side wall substantially perpendicular to a longitudinal axis of said automobile, a front edge defined as a line of intersection between a plane parallel to said floor and the lowermost end of said front side wall, and a top wall; and means for mounting said casing of said Doppler radar speed sensor completely within a forward upper corner of said chamber defined by said top wall, said front side wall and a plane containing said front edge and a tangential line drawn from said front edge to an outer diameter of a wheel located ahead of said chamber, the mouth of said antenna being directed toward the road surface and the rear end of said automobile, and wherein said radar casing is in the form of a triangular prism, whereby said Doppler radar speed sensor is protected from attacks by pebbles and splashes produced by said front wheels.

2. A mounting structure of a Doppler radar speed sensor as claimed in claim 1, wherein said chamber has a rear side wall between said top wall and said floor and said rear side wall slopes gradually with respect to said floor, whereby pebbles and splashes impacting thereagainst will be deflected away from said antenna mouth.

3. A mounting structure of a Doppler radar speed sensor as claimed in claim 1, wherein said antenna section is a microwave horn antenna.

4. A mounting structure of a Doppler radar speed sensor as claimed in claim 1, wherein said antenna section is a microwave slot array antenna.

5. A mounting structure of a Doppler radar speed sensor as claimed in claim 1, wherein said casing in the form of a triangular prism and said antenna are integrally formed.

6. A mounting structure according to claim 1, wherein said antenna mouth of the antenna section lies on a slanting wall of the casing that is arranged in a plane which angles upwardly between said front side wall and said top wall, an extension of said slanting plane passing over a rear edge of said chamber.

7. A mounting structure according to claim 1, wherein said prism is a right triangular prism.

8. A mounting structure according to claim 6, wherein said slanting wall is substantially parallel to an extension of said tangent line.

* * * * *